E. A. AMELI.
VEHICLE TOY.
APPLICATION FILED APR. 20, 1920.

1,364,471.

Patented Jan. 4, 1921.
2 SHEETS—SHEET 1.

Inventor:
Eugene A. Ameli
Chas. J. O'Neill,
Attorney.

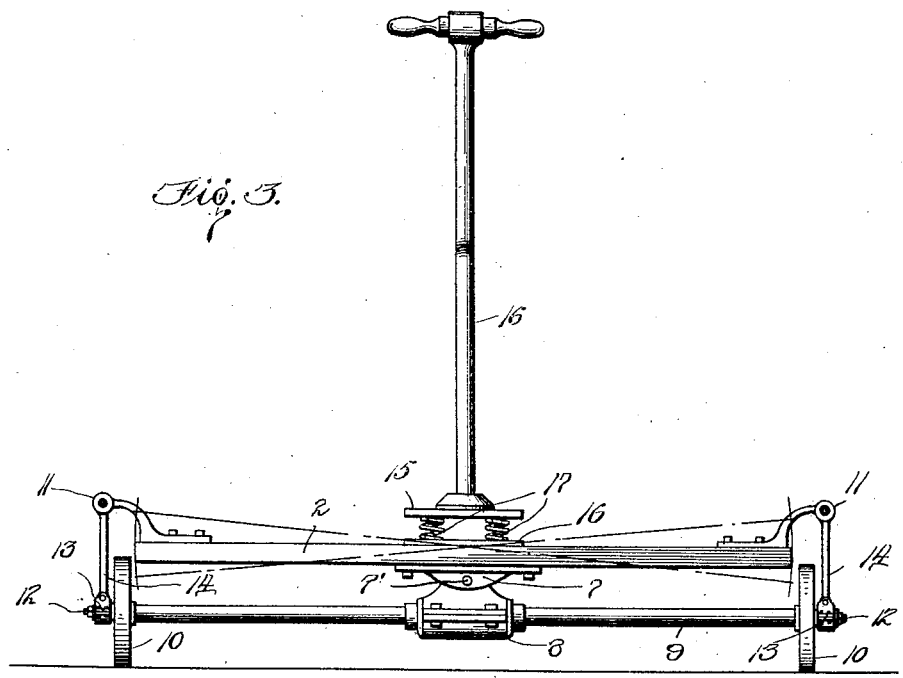
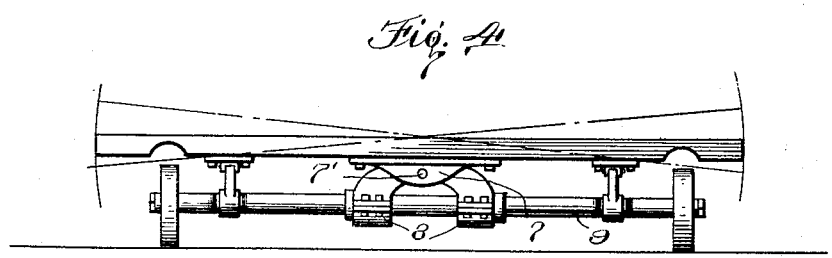
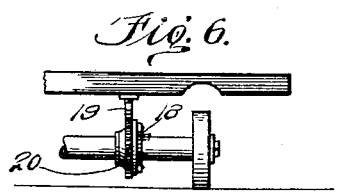
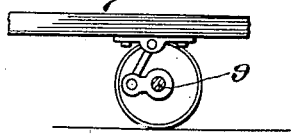
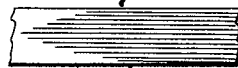

UNITED STATES PATENT OFFICE.

EUGENE A. AMELI, OF ASBURY PARK, NEW JERSEY.

VEHICLE TOY.

1,364,471.  Specification of Letters Patent.  Patented Jan. 4, 1921.

Application filed April 20, 1920. Serial No. 375,239.

*To all whom it may concern:*

Be it known that I, EUGENE A. AMELI, a citizen of the United States, residing at Asbury Park, county of Monmouth, State of New Jersey, have invented certain new and useful Improvements in Vehicle Toys; and I do hereby declare the following to be a full, clear, and exact description of the invention, such as will enable others skilled in the art to which it appertains to make and use the same.

This invention relates to improvements in vehicle toys of the type for the use and amusement of children, and relates particularly to a device of this character comprising a triangular shaped platform supported upon suitable wheels, so that the platform will be positioned close to the ground, and provided with means for propelling the vehicle upon the alternate downward movements, transversely of the platform, exerted at the extreme rear outer edges thereof, by the occupant standing upon the platform.

The object of the invention is to provide a device of this type which will not only furnish amusement and pleasure but at the same time will provide a source of exercise, by reason of its manner of operation.

Another object is the provision of a vehicle toy that will be rugged in construction, simple to manufacture and possessing no delicate parts that might be destroyed or disarranged by the usual rough handling, incident to toys of this description.

Briefly stated, the invention comprises a platform made in the shape of an isoceles triangle, having arranged under the base portion thereof a main supporting axle and associating wheels, and being transversely divided at the pointed head portion thereof forming two sections, the front or smaller section providing a bearing for the front supporting and steering wheel. The forward portion supporting the steering wheel is pivotally connected with the main portion of the platform and the after end or base of the platform is pivotally supported upon the main axle. Positioned at the rear outer edges of the platform, and depending therefrom, are a pair of crank arms, adapted to be eccentrically connected to either the axle or axle supporting wheels. With this construction the vehicle can be propelled by the occupant standing on the platform, swinging his weight from side to side, exerting alternate downward pressure transversely of the platform, at the extreme rear outer edges of the main portion or section of the platform.

In the accompanying drawings:—

Figure 1:
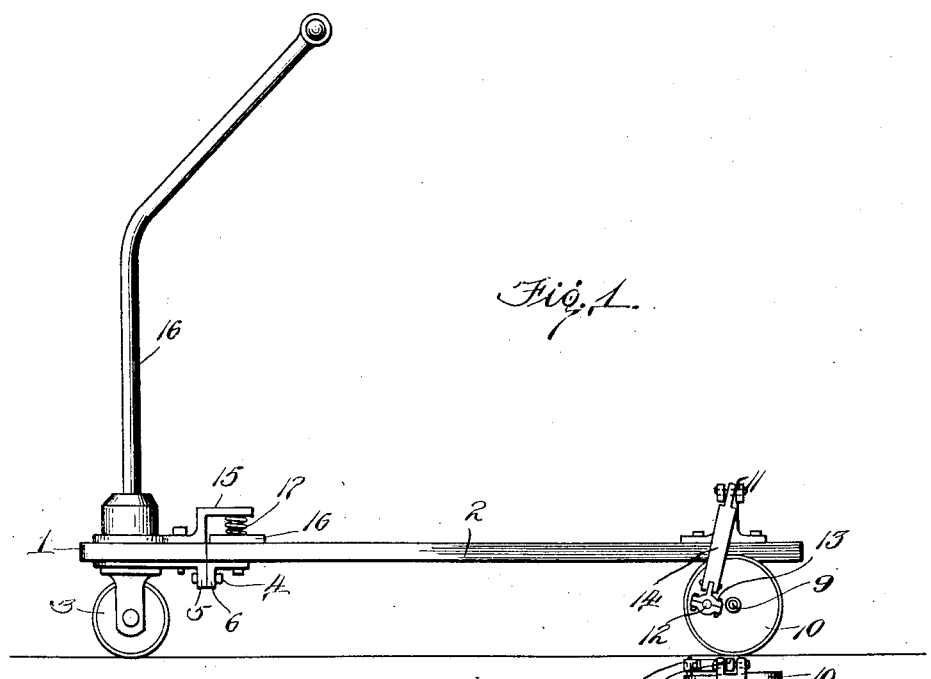
Figure 2:
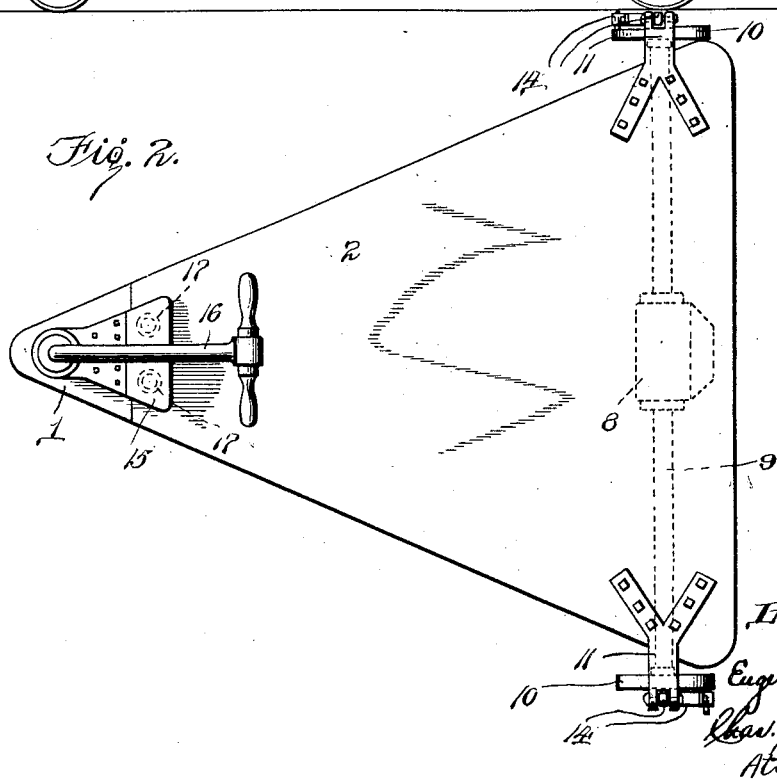

Figure 1 shows the vehicle in side elevation;

Fig. 2, a top plan view thereof;

Fig. 3, a rear end view; and

Figs. 4, 5, 6 and 7 modifications illustrating other driving means connecting the platform with the main supporting axle.

In the preferred form of the invention the platform is transversely divided to form a forward section 1, and a rear or main section 2, this forward section providing a support and bearing for a steering wheel 3. The section 1 is connected to the main section 2 by a pivot 4, through angles 5 and 6, secured to the sections 1 and 2, respectively. The rear portion of the main section 2 is provided with a bracket 7, pivotally connected at $7^1$ to a bearing 8, positioned on the main supporting axle 9. Journaled on the axle 9 are the main supporting or driving wheels 10, the axle being of such length as to allow these wheels to extend out beyond the edges of the platform, as clearly shown in Fig. 3.

The forward pivot 4 and the rear connecting pivot $7^1$ are both positioned on the longitudinal center line of the platform and under normal conditions support the weight and load of the vehicle. During the propelling operation the platform is oscillated or rocked about the pivots as will be more fully set forth as the description progresses.

At the rear of the main section 2 and positioned at the extreme outer edges thereof, are brackets 11, overhanging the wheels 10. Each of these is provided with an eccentrical positioned stub shaft 12, having a bearing 13, which bearing is in turn connected to the bracket 11 by a crank arm 14. It is to be here understood that to allow for the raising and lowering of the sides of the platform 2, during the operation of the vehicle, the crank arms 14 will necessarily have to be pivotally connected to both the overhanging bracket 11 and the bearing 13, as clearly shown in the drawings.

Secured to the upper portion of section 1 is a bracket 15, overhanging the main section 2, and between the under face of this bracket and the bearing plate 16, positioned on the section 2, are coil springs 17, which are adapted to maintain the sections 1 and 2 in their normal positions, but at the same time will allow the main section 2 to be oscillated about the pivots 4 and 7¹, during the operation of the vehicle. It will be noted that the brackets 5 and 15 form a substantial bearing for the support carrying the steering wheel 3, which steering wheel is provided with a suitable steering handle 16. This steering handle not only provides the means for guiding the vehicle but by turning the same quickly so that the forward supporting wheel 3 is thrown crosswise or transversely of the platform the said wheel will skid and act as a brake when the occasion arises, necessitating such a manipulation. In constructing the bracket 15 the portion thereof overhanging the section 2 will be of such width as to permit the spacing of the springs or other resilient means well apart for the purpose of obtaining as much bearing as possible, under normal conditions, without preventing the sufficient rocking of the platform during the operation of the device.

Referring to modification illustrated in Fig. 4, it will be noted that instead of eccentrically connecting the crank arm 14 to the wheel, said arm may be connected to a crank formed in the axle 9. If this construction is used the bracket for attaching the upper end of the crank arm to the platform, will be arranged on the under side of the platform and inside the wheels, as clearly shown in Fig. 4. The axle may also be shortened if desired and the wheels positioned inside and beneath the platform, the platform being cut out to permit this, as shown in Fig. 4.

Another modification of the invention is illustrated in Figs. 6 and 7, wherein the axle is provided with a ratchet mechanism 18 and in place of the crank arm 14, a rack bar 19 can be used for engaging with the teeth of the gear 20 arranged in connection with the ratchet mechanism.

From the foregoing description the operation of the vehicle is obvious. By standing upon the rear of the platform and exerting alternate downward pressure upon each side of said platform, through the crank arm 14 the necessary rotation will be imparted to the driving wheels or axle according to the specific construction employed.

What I claim is:—

1. In a vehicle toy, a platform, comprising a main section, and a pivoted forward section supporting a steering wheel, an axle and associated wheels providing the main supporting means, a pivotal connection between the main section and axle, crank arms carried by the rear of the main section at its outer edges adapted to be eccentrically connected with said main supporting means, for operating said vehicle upon the alternate downward movements exerted at the extreme rear outer edges of said main section.

2. In a vehicle toy, a platform, comprising a main section, and a pivoted forward section supporting a steering wheel, a bracket carried by said forward section overhanging the adjoining end of said main section, resilient means interposed between said bracket and said main section, an axle and associated wheels, providing the main supporting means, a pivotal connection between the main section and axle, crank arms carried by the rear of the main section at its outer edges adapted to be eccentrically connected with said main supporting means for operating said vehicle upon the alternate downward movements exerted at the extreme rear outer edges of said main section.

3. In a vehicle toy, a platform, comprising a main section, and a pivoted forward section supporting a steering wheel, a bracket carried by said forward section overhanging the adjoining end of said main section, resilient means interposed between said bracket and said main section, an axle and supporting wheels, providing the main supporting means, pivotally connected to said main section at the central longitudinal axis thereof, crank arms carried by the rear of the main section at its outer edges adapted to be eccentrically connected with said main supporting means, for operating said vehicle upon the alternate downward movements exerted at the extreme rear outer edges of said main section.

4. In a vehicle toy, a platform, comprising a main section, and a pivoted forward section supporting a steering wheel, a bracket carried by said forward section overhanging the adjoining end of said main section, resilient means interposed between said bracket and said main section, an axle and supporting wheels, providing the main supporting means, pivotally connected to said main section at the central longitudinal axis thereof, crank arms each having one end attached to and supported from the rear of the main section at the outer edges of said section, and their other ends adapted to be eccentrically connected with said main supporting means, for operating said vehicle upon the alternate downward movements exerted at the extreme rear outer edges of said main section.

5. In a vehicle toy, a platform, comprising a main section, and a pivoted forward section supporting a steering wheel, a bracket carried by said forward section overhanging the adjoining end of said main section, resilient means interposed between said bracket and said main section, an axle and supporting wheels, providing the main supporting means, pivotally connected to said main section at the central longitudinal axis thereof, brackets carried by the rear of the main section at its outer edges, crank arms supported from said brackets adapted to be eccentrically connected, with said main supporting means, for operating said vehicle upon the alternate downward movements exerted at the extreme rear outer edges of said main section.

6. In a vehicle toy, a platform, comprising a main section, and a pivoted forward section supporting a steering wheel, a bracket carried by said forward section overhanging the adjoining end of said main section, resilient means interposed between said bracket and said main section, an axle and supporting wheels, providing the main supporting means, pivotally connected to said main section at the central longitudinal axis thereof, brackets carried by the rear of the main section at its extreme outer edges, crank arms supported from said brackets adapted to be eccentrically connected with the wheels of said main supporting means, for operating said vehicle upon the alternate downward movements exerted at the extreme rear outer edges of said main section.

7. In a vehicle toy, a platform, comprising a main section, and a pivoted forward section supporting a steering wheel, an axle and associated wheels, providing the main supporting means for said vehicle, means carried by and supported from the outer edges of the main section adapted to be connected with the main supporting means for propelling said vehicle upon the alternate downward movements exerted at the extreme rear outer edges of said main section.

In testimony whereof I affix my signature.

EUGENE A. AMELI.